(12) United States Patent
Choi et al.

(10) Patent No.: US 12,556,978 B2
(45) Date of Patent: Feb. 17, 2026

(54) METHOD AND APPARATUS FOR CONTROLLING COMMUNICATION PARAMETERS DURING MULTI-COMMUNICATION

(71) Applicant: Samsung Electronics Co., Ltd., Suwon-si (KR)

(72) Inventors: Junsu Choi, Suwon-si (KR); Junyoung Park, Suwon-si (KR); Hyeonu Choi, Suwon-si (KR); Jeongyong Myoung, Suwon-si (KR); Junghun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 18/472,950

(22) Filed: Sep. 22, 2023

(65) Prior Publication Data

US 2024/0015597 A1    Jan. 11, 2024

Related U.S. Application Data

(63) Continuation of application No. PCT/KR2021/019590, filed on Dec. 22, 2021.

(30) Foreign Application Priority Data

Apr. 14, 2021    (KR) .................. 10-2021-0048340

(51) Int. Cl.
*H04W 28/24*    (2009.01)
*H04W 74/0816*    (2024.01)
*H04W 84/12*    (2009.01)

(52) U.S. Cl.
CPC ....... *H04W 28/24* (2013.01); *H04W 74/0816* (2013.01); *H04W 84/12* (2013.01)

(58) Field of Classification Search
CPC .. H04W 28/24; H04W 74/0816; H04W 84/12
See application file for complete search history.

(56) References Cited

U.S. PATENT DOCUMENTS 8,144,638 B2    3/2012    Lin et al.
8,908,656 B2    12/2014    Sadek et al.
(Continued)

FOREIGN PATENT DOCUMENTS

JP    2019-033321 A    2/2019
KR    10-1449355 B1    10/2014
(Continued)

OTHER PUBLICATIONS

International search report dated Apr. 4, 2022, issued in International Application No. PCT/KR2021/019590.
(Continued)

*Primary Examiner* — Mohammad S Anwar
(74) *Attorney, Agent, or Firm* — Jefferson IP Law, LLP

(57) ABSTRACT

A method and an apparatus for controlling communication parameters in multiple communication are provided. The apparatus includes a memory and a processor operatively coupled to the memory, wherein the memory includes instructions for allowing the processor to, set a first service period duration and a first wake interval, related to first communication, on the basis of the quality of service of the first communication, set a second service period duration and a second wake interval, related to second communication, on the basis of the quality of service of the second communication when a second communication connection having a frequency overlapping with that of the first communication is detected, determine whether the time difference between the first wake interval and the second wake interval occurs, and change, on the basis of the determina-
(Continued)

tion result, the first wake interval and the second wake interval to correspond to each other.

20 Claims, 12 Drawing Sheets

(56) References Cited

U.S. PATENT DOCUMENTS

| | | | |
|---|---|---|---|
| 9,497,704 | B2 | 11/2016 | Liao et al. |
| 11,252,773 | B2 | 2/2022 | Cheong et al. |
| 2005/0152324 | A1* | 7/2005 | Benveniste ........ H04W 52/0216 455/343.1 |
| 2012/0033645 | A1 | 2/2012 | Mantravadi et al. |
| 2012/0046000 | A1 | 2/2012 | Gao et al. |
| 2016/0219522 | A1 | 7/2016 | Asterjadhi et al. |
| 2017/0127439 | A1 | 5/2017 | Gopal et al. |
| 2020/0084102 | A1 | 3/2020 | Choi et al. |
| 2020/0229086 | A1 | 7/2020 | Monajemi et al. |
| 2020/0267655 | A1* | 8/2020 | Awoniyi-Oteri ................... H04W 52/0216 |
| 2021/0037546 | A1 | 2/2021 | Luo et al. |
| 2021/0195521 | A1* | 6/2021 | Müller .............. H04W 76/28 |

FOREIGN PATENT DOCUMENTS

| | | |
|---|---|---|
| KR | 10-1462083 B1 | 11/2014 |
| KR | 10-2018-0110896 A | 10/2018 |
| KR | 10-2020-0028208 A | 3/2020 |
| KR | 10-2021-0020542 A | 2/2021 |
| WO | 2018/161244 A1 | 9/2018 |

OTHER PUBLICATIONS

Written Opinion dated Apr. 4, 2022, issued in International Application No. PCT/KR2021/019590.

Extended European Search Report dated Jun. 25, 2024; European Appln. No. 21937103.6-1215 / 4301074 PCT/KR2021019590.

* cited by examiner

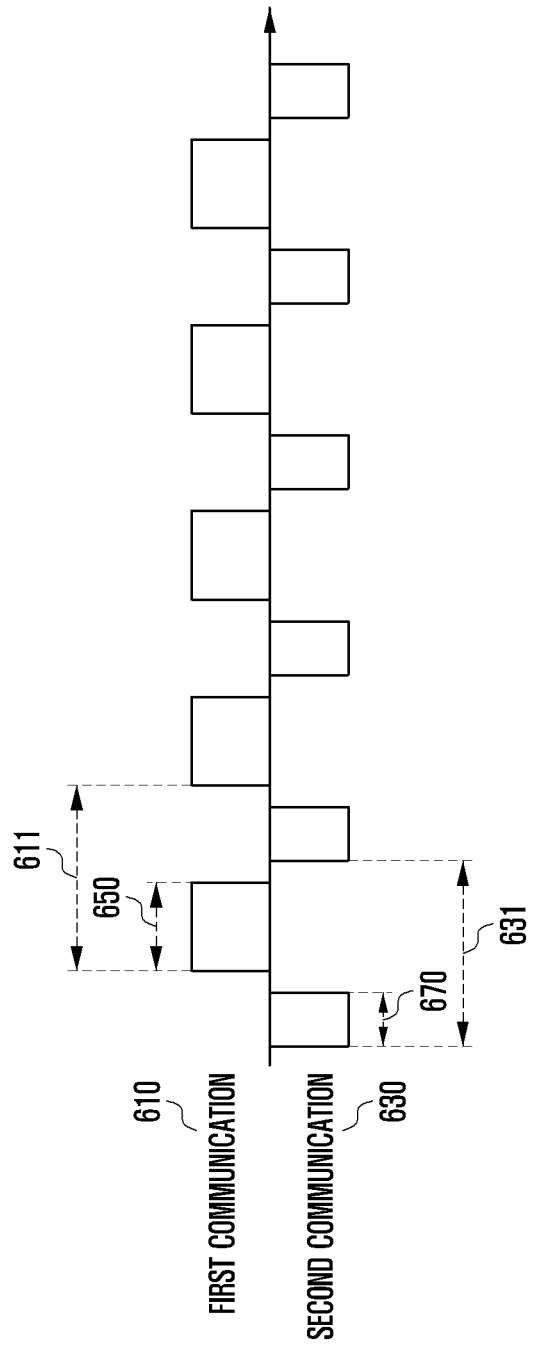

METHOD AND APPARATUS FOR CONTROLLING COMMUNICATION PARAMETERS DURING MULTI-COMMUNICATION

CROSS-REFERENCE TO RELATED APPLICATION(S)

This application is a continuation application, claiming priority under § 365(c), of an International application No. PCT/KR2021/019590, filed on Dec. 22, 2021, which is based on and claims the benefit of a Korean patent application number 10-2021-0048340, filed on Apr. 14, 2021, in the Korean Intellectual Property Office, the disclosure of which is incorporated by reference herein in its entirety.

BACKGROUND

1. Field

The disclosure relates to a method and an apparatus for controlling communication parameters in multiple communication.

2. Description of Related Art

Institute of Electrical and Electronics Engineers (IEEE) 802.11 ax amendments have introduced not only technologies for improving a maximum transmission rate such as wireless local area network (WLAN) standard but also many technologies for mitigating performance deterioration and increasing efficiency in an environment in which various devices operate together. For example, a target wake time (TWT) technology in which an electronic device connected to an access point (AP) negotiates wake times at a predetermined cycle and a predetermined interval to perform packet transmission and reception has been introduced. In the TWT technology, the electronic device or the AP may configure a first wake time, a wake interval for determining the next wake time after the first wake time, and a service period (for example, service period duration) in which data is transmitted and received at each wake time.

Meanwhile, with the development of digital technologies, various types of electronic devices such as mobile communication terminals, personal digital assistants (PDAs), electronic organizers, smartphones, tablet personal computers (PCs), and wearable devices have become widely used. Various connectivity technologies may be applied to the electronic devices. For example, the connectivity technologies may include a wireless fidelity (Wi-Fi) technology for allowing a broadband network connection, a Bluetooth technology for providing a connection with peripheral devices, such as earphones, a headset, and a mouse, and an ultra wide band (UWB) technology for measuring the distance between two electronic devices. Most of the connectivity technologies may operate using common unlicensed frequency bands, and when different connectivity technologies are simultaneously used, communication interference may be generated between connectivity technologies.

The above information is presented as background information only to assist with an understanding of the disclosure. No determination has been made, and no assertion is made, as to whether any of the above might be applicable as prior art with regard to the disclosure.

SUMMARY

Wi-Fi may occupy frequency resources on the basis of carrier sensing multiple access with collision avoidance (CSMA/CA) which is one type of random access. The random access may not expect when a data packet is received from an AP or another electronic device due to a characteristic thereof. Accordingly, when Wi-Fi and other communication technologies operate or different modes of Wi-Fi operate together, the electronic device may be required to perform an operation of continuously monitor whether Wi-Fi is using time resources and making a request and accepting time resource occupancy according thereto.

Wi-Fi may use unlicensed frequency bands of 2.4 gigahertz (GHz), 5 GHz, or 6 GHz, Bluetooth may use unlicensed frequency bands of 2.4 GHz, and UWB may use frequency bands of 6 GHz. When Wi-Fi operates in the band of 2.4 GHz, interference between Wi-Fi and Bluetooth may be generated. Alternatively, when Wi-Fi operates in the band of 6 GHz, interference between Wi-Fi and UWB may be generated.

Further, for Wi-Fi, various modes, such as a Wi-Fi station for the connection to the broadband network, Wi-Fi direct for sharing large media between electronic devices, Wi-Fi aware making discovery and service group configuration between adjacent electronic device possible, or Wi-Fi hotspot sharing the Internet connection with another electronic device through neighbor awareness networking (NAN) or a cellular network, are defined. Accordingly, the electronic device may need a scheme of operating without any interference between different communication connections when different connection technologies or different modes of Wi-Fi are simultaneously used.

Aspects of the disclosure are to address at least the above-mentioned problems and/or disadvantages and to provide at least the advantages described below. Accordingly, an aspect of the disclosure is to provide a method and an apparatus for, a second communication connection is detected while first communication is performed, configuring and adjusting a wake interval (for example, a wake time interval) or a service period (for example, service period duration) of the first communication in order to operate without any interference between different communication connections.

Additional aspects will be set forth in part in the description which follows and, in part, will be apparent from the description, or may be learned by practice of the presented embodiments.

In accordance with an aspect of the disclosure, an electronic device is provided. The electronic device includes a memory and a processor operatively connected to the memory, wherein the memory includes instructions causing the processor to configure a first service period and a first wake interval related to first communication, based on a quality of service (QoS) of the first communication, in case that a connection of a second communication having a frequency overlapping a frequency of the first communication is detected, configure a second service period and a second wake interval related to the second communication, based on a QoS of the second communication, determine whether the first wake interval and the second wake interval have a time difference, and change at least one of the first wake interval or the second wake interval such that the first wake interval corresponds to the second wake interval, based on a result of the determination.

In accordance with another aspect of the disclosure, a method of operating an electronic device is provided. The method includes configuring a first service period and a first wake interval related to first communication, based on a quality of service (QoS) of the first communication, in case that a connection of a second communication having a frequency overlapping a frequency of the first communication is detected, configuring a second service period and a second wake interval related to the second communication, based on a QoS of the second communication, determining whether the first wake interval and the second wake interval have a time difference, and making a change such that the first wake interval corresponds to the second wake interval, based on a result of the determination.

According to various embodiments, when a connection of second communication is detected while first communication is performed, it is possible to control the first communication and the second communication to coexist by changing a first wake interval of the first communication to correspond to a second wake interval of the second communication.

According to various embodiments, even when different communication connections are made, it is possible to satisfy a QoS of the first communication by changing the first wake interval of the first communication to correspond to the second wake interval of the second communication and changing the first service period of the first communication according to the first wake interval.

According to various embodiments, it is possible to stably maintain different communication connections by controlling the first service period of the first communication and the second service period of the second communication to not overlap each other.

According to various embodiments, it is possible to satisfy both the QoS of the first communication and the QoS of the second communication by controlling the QoS of the first communication or the second communication on the basis of priorities of the communication.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 6A and 6B illustrate an example in which an electronic device controls wake intervals according to various embodiments of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
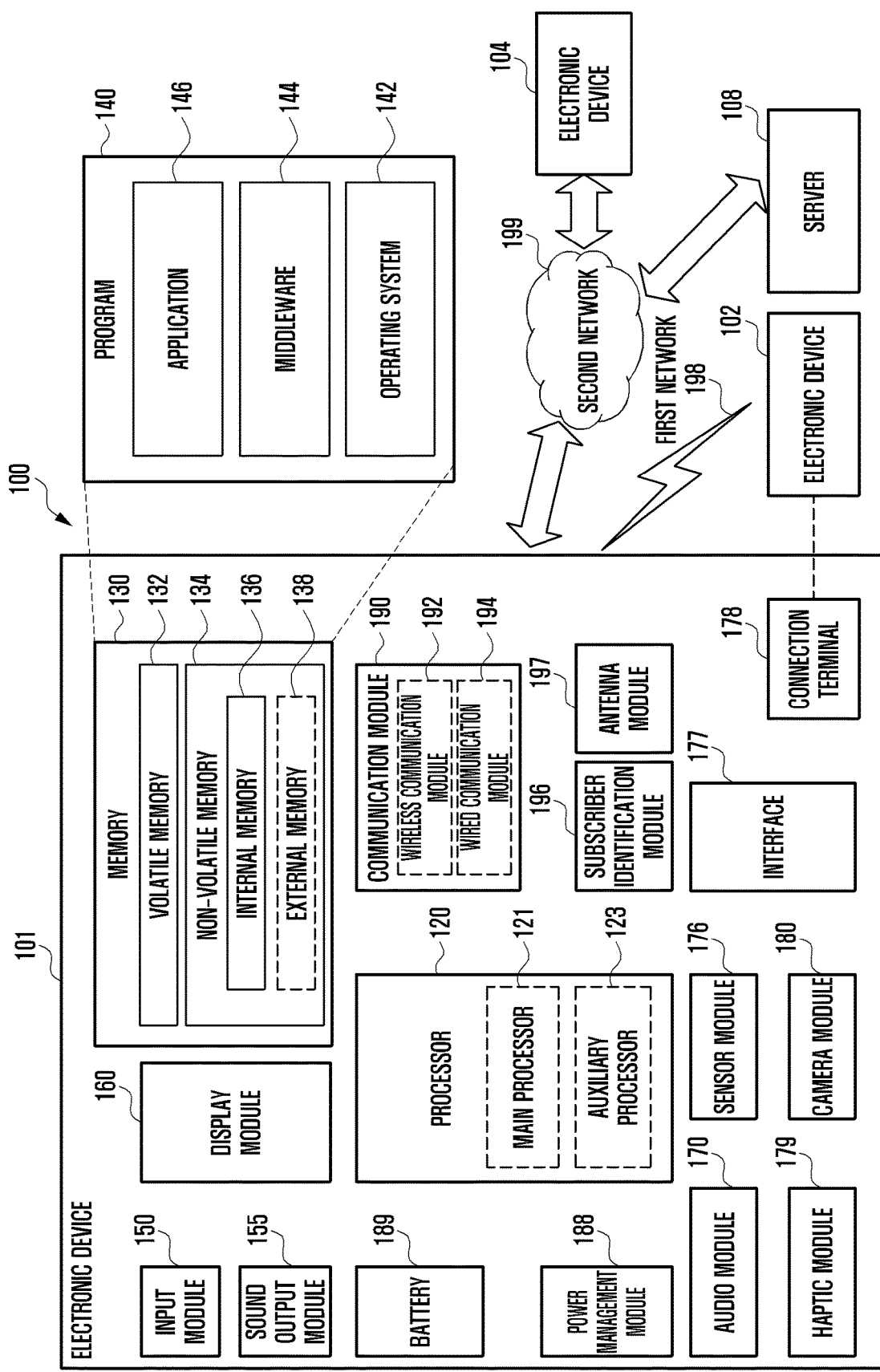
FIG. 1 is a block diagram illustrating an electronic device within a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
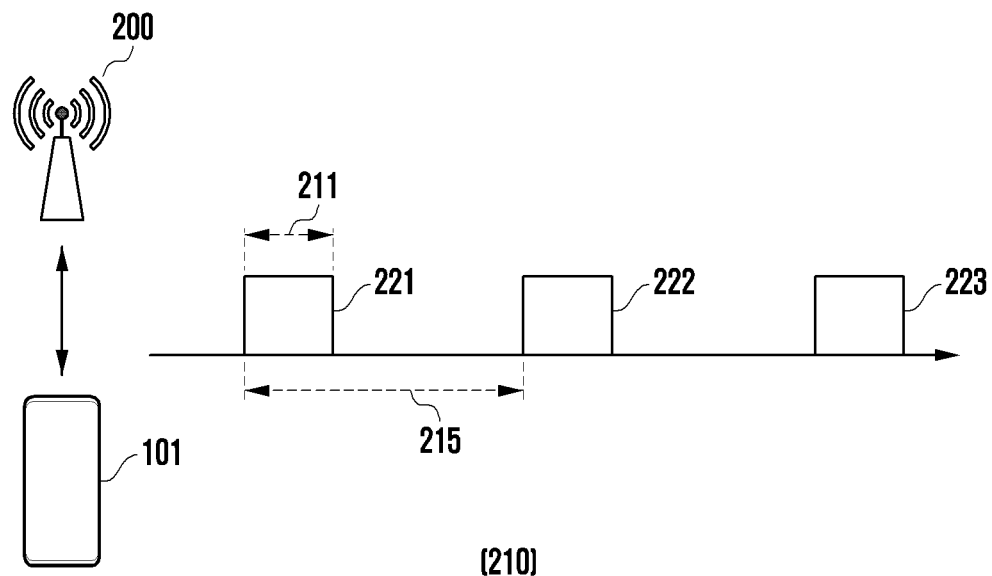
FIG. 2 illustrates an example in which an electronic device makes multiple communication connections according to an embodiment of the disclosure.
Figure 2:
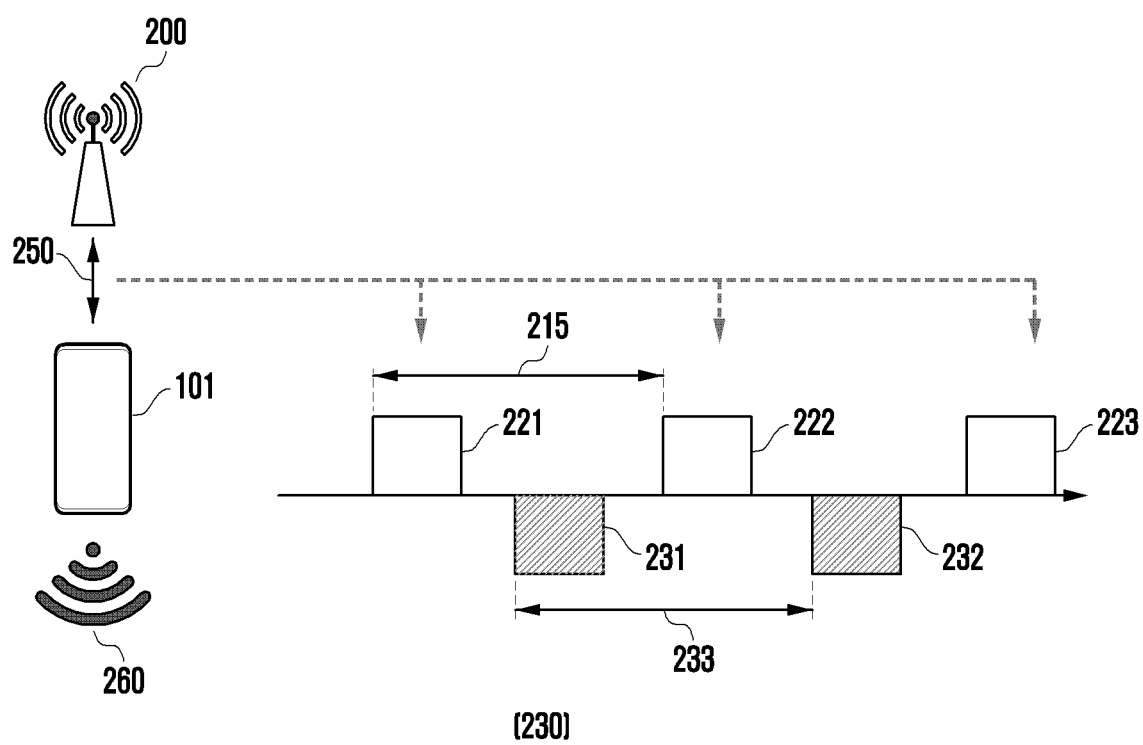

FIG. 2 illustrates an example in which an electronic device makes multiple communication connections according to an embodiment of the disclosure.

Referring to FIG. 2, a first connection 210 may be a state in which an electronic device (for example, the electronic device 101 of FIG. 1) and an access point (AP) 200 are connected through Wi-Fi according to various embodiments. The first connection 210 may be a state in which the electronic device 101 operates only in a Wi-Fi station mode for the connection to a broadband network. The electronic device 101 may be connected to Bluetooth communication (or low-energy Bluetooth) or ultra wide band (UWB) communication that measures the distance between two electronic devices as well as Wi-Fi. Alternatively, for Wi-Fi, various modes, such as a Wi-Fi station for the connection to the broadband network, Wi-Fi direct for sharing large media between electronic devices, Wi-Fi aware making discovery and service group configuration between adjacent electronic devices possible, or Wi-Fi hotspot sharing the Internet connection with another electronic device through neighbor awareness networking (NAN) or a cellular network, are defined. The first connection 210 may be a state in which the electronic device 101 operates only in a Wi-Fi state mode among various communication connections or various Wi-Fi modes.

In the first connection 210, the electronic device 101 may configure a wake interval (wake time interval) 215 for determining a service interval 211 (for example, a service period duration) in which data packets are exchanged with the AP 200 or the next wake time after a first wake time. The electronic device 101 may negotiate the service period 211 and the wake interval 215 with the AP 200 according to a target wake time (TWT) technology. For example, the electronic device 101 may configure the service period 211 and the wake interval 215 on the basis of a state of the electronic device 101 or a state of a Wi-Fi link (for example, the AP 200). The state of the electronic device 101 may include information on an application being executed in the electronic device 101. Requirements of a quality of service (QoS) may vary depending on an application. Further, the state of the Wi-Fi link may include a data transmission rate through the AP 200 or a degree of contention with external devices connected to the AP 200.

According to various embodiments, the requirements of the QoS may vary depending on an application and a type of connected communication (for example, Bluetooth, UWB, or Wi-Fi mode). The QoS requirements according to the application may be relevant to a data transmission rate (or an update time) or a data resolution. The data transmission rate may be influenced by a transmission rate provided by the AP 200 or a degree of contention with external devices connected to the AP 200. For example, the data transmission rate of the AP 200 may vary depending on a network state. The degree of contention with the external devices connected to the AP 200 may be a degree according to how many external devices are connected to the AP 200. For example, as the number of external devices connected to the AP 200 is larger, a delay time until the AP 200 receives the data packet transmitted by the electronic device 101 may be generated.

For example, the data transmission rate may become slower as the number of external devices connected to the AP 200 is larger, and the data transmission rate may become faster as the number of external devices connected to the AP 200 is smaller. Alternatively, the data transmission rate may be slower than a data transmission rate configured in the AP 200 when the number of external devices connected to the AP 200 is larger than a preset number (for example, three or five), the data transmission rate may be equal to or faster than the data transmission rate configured in the AP 200 when the number of external devices connected to the AP 200 is equal to or smaller than the preset number. The electronic device 101 may configure the service period 211 and the wake interval 215 on the basis of at least one of the application being executed in the electronic device 101, the data transmission rate through the AP 200, and the degree of contention with the external devices connected to the AP 200.

According to various embodiments, the electronic device 101 may negotiate the service period 211 and the wake interval 215 with the AP 200 on the basis of the configuration and negotiate the first wake time. For example, the electronic device 101 may exchange data packets with the AP 200 during a first service period 221 at the first wake time and, when the first service period 221 expires, switch to a sleep state (or an idle state or an inactive state). The wake interval 215 may be a time from a wake time of the first service period 221 to a wake time of a second service period 222. The electronic device 101 may wake up from the sleep state at a second wake time, exchange data packets with the AP 200 during the second service period 222, and when the second service period 222 expires, switch to the sleep state. Waking up from the sleep state may be switching from the sleep state to an operating state (or an active state). The electronic device 101 may wake up from the sleep state at a third wake time, exchange data packets with the AP 200 during a third service period 223, and when the third service period 223 expires, switch to the sleep state. The electronic device 101 may store data packets to be transmitted to the AP 200 in a buffer (for example, the memory 130 of FIG. 1) during the sleep state.

A second connection 230 may be a state in which the electronic device 101 is connected to second communication 260 (for example, Bluetooth, UWB, or another mode of Wi-Fi) while the first connection 210 is maintained. The second connection 230 may be communication using a frequency overlapping with the first connection 210. For example, the electronic device 101 may be connected to the first communication 250 (for example, Wi-Fi) and simultaneously connected to Bluetooth or UWB communication (for example, the second communication 260). Alternatively, the electronic device 101 may be connected to a station mode of the first communication 250 and simultaneously connected to a Wi-Fi hotspot mode (for example, the second communication 260). The second connection 230 may be a concept including not only communication connections (for example, Bluetooth and UWB) in the type different from the first connection 210 but also communication connection of other modes of the first connection 210 (for example, Wi-Fi direct, Wi-Fi aware, and Wi-Fi hotspot).

The electronic device 101 may configure a service period 231 and a wake interval 233 on the basis of requirements of QoS of the second communication 260. The electronic device 101 may configure the service period 231 and the wake interval 233 on the basis of the QoS requirements of the second communication 260 or an application using the second communication 260. The electronic device 101 may configure the service period 231 and the wake interval 233 related to the second communication 260 to not overlap the service period related to the first connection 210. For example, the electronic device 101 may exchange data packets with the AP 200 during the first service period 221 of the first communication 250 and, when the first service period 221 of the first communication 250 expires, switch the communication connection through the first communication 250 to the sleep state. The electronic device 101 may exchange data packets during the first service period 231 of the second communication 260 in the sleep state of the first communication 250 and, when the first service period 231 of the second communication 260 expires, switch the communication connection through the second communication 260 to the sleep state.

The electronic device 101 may wake up in the second service period 222 of the first communication 250 according to the wake interval 215 of the first communication 250, exchange data packets with the AP 200, and when the second service period 222 of the first communication 250 expires, switch the communication connection through the first communication 250 to the sleep state. The communication connection through the second communication 260 may be in the sleep state during the second service period 222 of the first communication 250. The electronic device 101 may exchange data packets during the second service period 232 of the second communication 260 according to the wake interval 233 of the second communication 260 and, when the second service period 232 of the second communication 620 expires, switch the communication connection through the second communication 260 to the sleep state. The communication connection of the electronic device 101 through the first communication 250 may be in the sleep state during the second service period 232 of the second communication 260. The electronic device 101 may wake up in the third service period 223 of the first communication 250 according to the wake interval 215 of the first communication 250, exchange data packets with the AP 200, and when the third service period 223 of the first communication 250 expires, switch the communication connection through the first communication 250 to the sleep state. The communication connection of the electronic device 101 through the second communication 260 may be in the sleep state during the third service period 223 of the first communication 250.

According to various embodiments, the wake interval 215 of the first communication 250 may be the same as or different from the wake interval 233 of the second communication 260. The wake interval 215 and the wake interval 233 being the same as or different from each other may mean that the time of the wake intervals may be the same as or different from each other. The electronic device 101 may divide the time while satisfying the QoS of the first communication 250 and the second communication 260 and make the connection to the first communication 250 and the second communication 260. The electronic device 101 may configure the service period or the wake interval of the first communication 250 or the second communication 260 such that the service period 211 of the first communication 250 does not overlap the service period 231 of the second communication 260, so as to transmit and receive data packets through the second communication 260 during the sleep state of the first communication 250. Although it is illustrated that the connection to the first communication 250 is first made and then the connection to the second communication 260 is made in the drawings, the same or similar operation may be applied to the case in which the connection to the second communication 261 is first made and then the connection to the first communication 250 is made. The disclosure is not limited by the description.

An electronic device (for example, the electronic device 101 of FIG. 1) according to various embodiments of the disclosure may include a memory (for example, the memory 130 of FIG. 1) and a processor (for example, the processor 120 of FIG. 1) operatively connected to the memory, and the memory may include instructions causing the processor to configure a first service period and a first wake interval related to first communication, based on a quality of service (QoS) of the first communication, in case that a connection of a second communication having a frequency overlapping a frequency of the first communication is detected, configure a second service period and a second wake interval related to the second communication, based on a QoS of the second communication, determine whether the first wake interval and the second wake interval have a time difference, and make a change such that the first wake interval corresponds to the second wake interval, based on a result of the determination.

The memory may further include instructions causing the processor to, in case that the first wake interval is smaller than the second wake interval, change the second wake interval to correspond to the first wake interval, and in case that the second wake interval is smaller than the first wake interval, change the first wake interval to correspond to the second wake interval.

The memory may further include instructions causing the processor to configure the first service period and the first wake interval, based on at least one of an application being executed in the electronic device, a data transmission rate related to the first communication, or a contention degree.

The memory may further include instructions causing the processor to detect the connection of the second communication having the frequency overlapping the frequency of the first communication in a state in which a connection of the first communication is maintained.

The memory may further include instructions causing the processor to maintain the first wake interval and the second wake interval in case that the first wake interval corresponds to the second wake interval.

The memory may further include instructions causing the processor to change the first service period in case that the first wake interval is changed.

The memory may further include instructions causing the processor to determine whether a sum of the first service period and the second service period is larger than the first wake interval, and change the first service period or the second service period, based on a result of the determination.

The memory may further include instructions causing the processor to, in case that the sum of the first service period and the second service period is larger than the first wake interval, identify priorities of the first communication and the second communication, adjust the QoS of the first communication or the second communication, based on the identified priorities, and change the first service period or the second service period according to the adjusted QoS.

The memory may further include instructions causing the processor to, in case that the priority of the first communication is higher than the priority of the second communication, adjust the QoS of the second communication, and change the first service period, based on the QoS of the first communication and the second service period, based on the adjusted QoS of the second communication.

The memory may further include instructions causing the processor to, in case that the sum of the first service period and the second service period is equal to or smaller than the first wake interval, determine whether the first service period and the second service period overlap, in case that the first service period and the second service period overlap, configure a start time of the first service period, and perform a first communication negotiation for at least one of the configured first wake interval, the first service period, or the start time of the first service period.

The electronic device may further include a first processor and a communication module (for example, the communication module 190 of FIG. 1), the processor may be a second processor included in the communication module, and the memory may further include instructions causing the second processor to receive the QoS of the first communication or the QoS of the second communication from the first processor.

Figure 3:
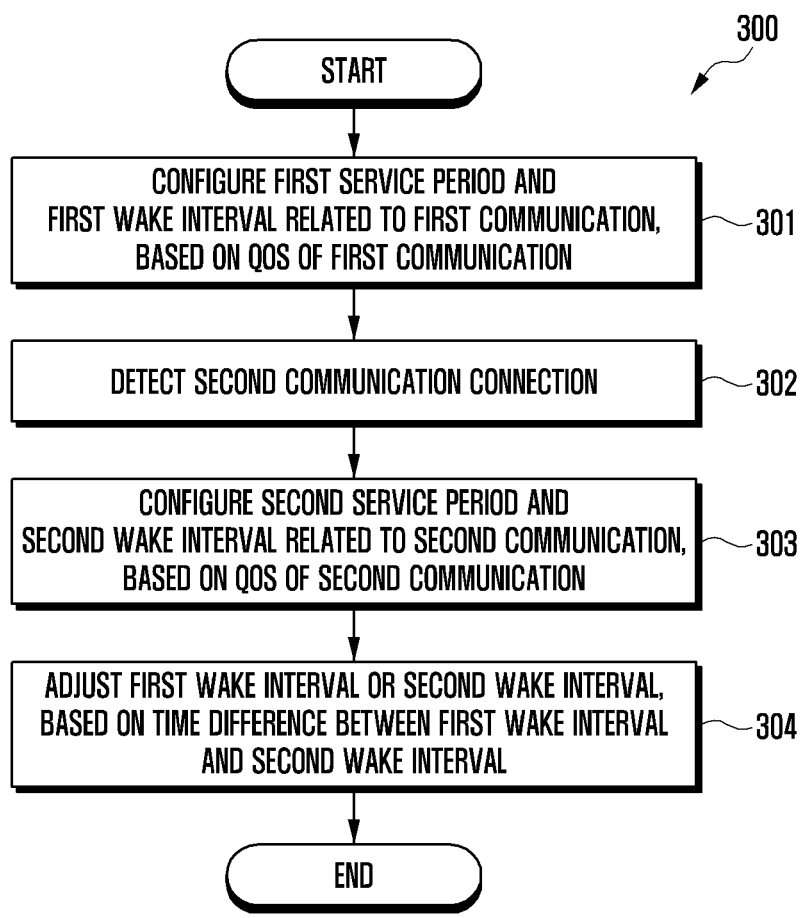
FIG. 3 is a flowchart illustrating an operation method of the electronic device according to an embodiment of the disclosure.

FIG. 3 is a flowchart 300 illustrating a method of operating an electronic device according to an embodiment of the disclosure.

Referring to FIG. 3, in operation 301, a processor (for example, the processor 120 of FIG. 1) of an electronic device (for example, the electronic device 101 of FIG. 1) according to various embodiments may configure a first service period and a first wake interval related to the first communication 250 on the basis of the QoS of the first communication (for example, the first communication 250 of FIG. 2). The first communication 250 may be one of Wi-Fi, Bluetooth, and UWB, or may be a first mode (for example, a station mode) of Wi-Fi. Hereinafter, for convenience of description, the case in which the first communication 250 is the Wi-Fi station mode is described. The disclosure is not limited by the description. The processor 120 may configure a first service period (for example, the service period 211 of FIG. 2) and a first wake interval (for example, the wake interval 215 of FIG. 2) on the basis of a state of the electronic device 101 or a state of a Wi-Fi link (for example, the AP 200 of FIG. 2). The state of the electronic device 101 may include information on an application being executed in the electronic device 101. The state of the AP 200 may include a data transmission rate through the AP 200 or a degree of contention with external devices connected to the AP 200.

According to various embodiments, the requirements of the QoS may vary depending on an application and a type of connected communication (for example, Bluetooth, UWB, or Wi-Fi mode). For example, in the case of a phone call application, a service period according to the QoS may be 10 ms, and in the case of a game application, a service period according to the QoS may be 3 ms. The QoS of an application may be configured by an application developer or configured by the electronic device 101 on the basis of an application type. Further, the data transmission rate through the AP 200 may be influenced by the degree of contention with external devices connected to the AP 200. For example, the data transmission rate may become slower as the number of external devices connected to the AP 200 is larger, and the data transmission rate may become faster as the number of external devices connected to the AP 200 is smaller. The processor 120 may configure the first service period and the first wake interval on the basis of the state of the electronic device 101 or the state of the AP (for example, the AP 200 of FIG. 2) while satisfying the QoS of the first communication 250.

According to various embodiments, the processor 120 may determine whether the configured first service period and first wake interval satisfy the QoS of the first communication 250 according to a TWT negotiation configured by the AP 200. For example, the processor 120 may collect at least one statistical information among a time at which data packets stored in a buffer (for example, the memory 130 of FIG. 1) are transmitted or received during an interval between two service periods (for example, a doze state or a sleep state), a time at which data packets are transmitted during a service period, a time at which data packets are received, the number of transmitted and received data packets, or a time at which a termination request is received from the AP 200 in the service period. The processor 120 may determine whether the configured service period and wake interval satisfy the QoS of the first communication 250 on the basis of the collected statistical information or the application being executed in the electronic device 101.

Referring to FIG. 2, in the second communication 260, the electronic device 101 may be in the sleep state for the first communication 250 during the time between the first service period 221 and the second service period 222. The processor 120 may collect the time for transmitting or receiving data packets stored in the memory 130 during the sleep state for the first communication 250. When the AP 200 transmits all of the data packets to be transmitted during the service period, the AP 200 may make a request for early termination of the service period to the electronic device 101. The processor 120 may collect the time at which the early termination is received from the AP 200 during the service period or information on how much early termination is received. The processor 120 may change the configured first service period and first wake interval on the basis of the collected statistical information for a predetermined time (for example, during 10, 50, or 100 service periods).

For example, the processor 120 may adjust (or change) the first service period on the basis of an average time of transmission or reception of data packets during the service period and the average number of data packets transmitted or received during the service period. The processor 120 may calculate (or estimate) the time required for transmitting or receiving data packets on the basis of the average time of transmission and reception during the service period and the average number of data packets. The processor 120 may decrease the time of the service period when the number of data packets transmitted and received during the service period is smaller than a preset number, and may increase the time of the service period when the number of data packets transmitted and received during the service period is larger than the preset number.

Alternatively, the processor 120 may adjust the configured first service period such that a margin between a time at which the last data packet is transmitted or received within the service period and an end time of the service period satisfies a preset threshold value. For example, the processor 120 may increase the time of the configured first service period when the margin is equal to or smaller than the preset threshold, and may decrease the time of the configured first service period when the margin is larger than the preset threshold value.

Alternatively, the processor 120 may adjust the configured first service period on the basis of the number of early termination requests collected for a predetermined time or an average time of reception of the early termination. When the number of external devices connected to the AP 200 is larger than a preset number, latency required for transmitting data packets according to medium access control between devices may be additionally generated. The processor 120 may change (for example, decrease or increase) the time of the configured first service period and first wake interval on the basis of the statistical information collected for a predetermined time.

According to various embodiments, a mode related to latency may be configured in the application, and the processor 120 may configure the first wake interval according to the mode configured in the application. The mode related to the latency may include various modes such as extremely low, low, and normal. The processor 120 may change (for example, decrease or increase) the time of the configured first service period and first wake interval on the basis of a cycle on which the application currently executed in the electronic device 101 generates traffic, an amount of traffic generated by the electronic device 101, and an allowable range of latency.

A QoS including at least one of the transmission cycle of the application, the amount of generated traffic, or the allowable latency range may be configured in the application. The processor 120 may change (for example, decrease or increase) the time of the configured first service period and first wake interval on the basis of the QoS of the application. The processor 120 may check the QoS of the application and, when the QoS is not configured, may download the QoS of the application from an application server (for example, the server 108 of FIG. 1) and use the same.

The processor 120 may configure the optimal first service period and first wake interval which have been configured to satisfy the QoS of the application being executed in consideration of at least one of the QoS of the application being executed, a data transmission rate, or a contention degree and make a TWT agreement with the AP 200. For example, the processor 120 may configure the first wake interval on the basis of a transmission cycle and a traffic amount based on the QoS of the application and configure the first service period required data transmission by dividing the traffic amount by the data transmission rate. The processor 120 may configure the first service period or the first wake interval in further consideration of additional information as well as the above-mentioned information. The example is only for helping understanding of the disclosure, and the disclosure is not limited by the example.

In operation 302, the processor 120 may detect the connection of second communication (for example, the second communication 260 of FIG. 2). The second communication 260 may be communication using a frequency overlapping with the first communication 250. The second communication 260 may be a communication scheme (for example, Bluetooth or UWB) different from the first communication 250 or another mode of the first communication 250. When the first communication 250 is the Wi-Fi station mode, the second communication 260 may be Bluetooth communication or the Wi-Fi aware mode. The second communication 260 may be a concept including not only communication connections (for example, Bluetooth and UWB) in the type different from the first communication 250 but also communication connection of other modes of the first communication 250 (for example, Wi-Fi direct, Wi-Fi aware, and Wi-Fi hotspot). Hereinafter, for convenience of description, the case in which the second communication 260 is Bluetooth communication is described as an example. The disclosure is not limited by the description.

In operation 303, the processor 120 may configure a second service period and a second wake interval related to the second communication 260 on the basis of the QoS of the second communication 260. The second service period and the second wake interval of the second communication 260 may be distinguished from the first service period and the first wake interval of the first communication 250. When the second communication 260 is Bluetooth communication, the processor 120 may configure the service internal and the wake interval according to a service period and wake interval configuration procedure (for example, broadcast, scan, configuration) of the Bluetooth communication. Since the procedure of configuring the service period and the wake interval of Bluetooth communication corresponds to the known technology, a detailed description thereof may be omitted. When the second communication 260 is UWB communication, the processor 120 may configure the service period and the wake interval according to a service interval and wake interval configuration procedure (for example, poll, response, or final) of the UWB communication. Since the procedure of configuring the service period and the wake interval of UWB communication corresponds to the known technology, a detailed description thereof may be omitted.

In operation 304, the processor 120 may adjust the first wake interval or the second wake interval on the basis of a time difference between the first wake interval and the second wake interval. The processor 120 may wake up and communicate in the first service period according to the first wake interval, when the first service period expires, switches to the sleep state for the first communication 250, wake up and communicate in the second service period according to the second wake interval, and when the second service period expires, switch to the sleep state for the second communication 260. The processor 120 may perform the first communication 250 during the sleep state for the second communication 260 and perform the second communication 260 during the sleep state for the first communication 250.

According to various embodiments, when the time of the first wake interval is different from the time of the second wake interval, a problem that the first service period and the second service period overlap each other every predetermined cycle corresponding to a common multiple of the two wake intervals may occur. In this case, efficiency of the operation for allowing the first communication 250 and the second communication 260 to coexist may deteriorate. When the first wake interval does not correspond to the second wake interval, the processor 120 may adjust the wake interval to be a wake interval having a smaller time among the first wake interval and the second wake interval. For example, when the first wake interval is smaller than the second wake interval, the processor 120 may reduce the time of the second wake interval according to the first wake interval. Alternatively, when the first wake interval is larger than the second wake interval, the processor 120 may reduce the time of the first wake interval according to the second wake interval. The processor 120 may adjust the first wake interval or the second wake interval such that the time of the first wake interval corresponds to the time of the second wake interval.

According to various embodiments, after adjusting the first wake interval or the second wake interval, the processor 120 may adjust the first service period or the second service period. When the first wake interval is changed to correspond to the second wake interval, the number of data packets generated during the first wake interval may decrease and thus the processor 120 may change the first service period on the basis of the changed first wake interval. When the time of the first wake interval is reduced, the processor 120 may reduce the first service period. When the first service period is adjusted, the processor 120 may configure the wake up time of the first service period such that the wake up time of the first service period and the wake up time of the second service period have a difference therebetween.

According to various embodiments, when the first wake interval corresponds to the second wake interval, the processor 120 may omit operation 304.

Although it is illustrated that the configuration related to the first communication is first performed and the configuration related to the second communication is performed when the connection of the second communication is detected in drawings, the configuration related to the second communication may be first performed and then the configuration related to the first communication may be performed when the connection of the first communication is detected. The example through the drawings is only for helping understanding of the disclosure, and does not limit the disclosure.

Figure 4:
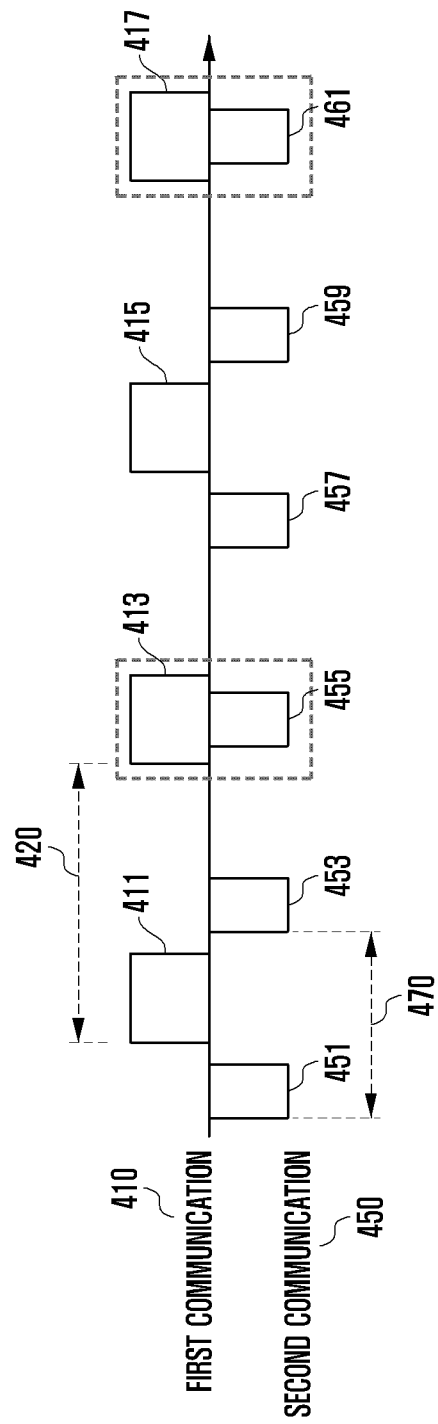
FIG. 4 illustrates an example in which an electronic device performs time division to make multiple communication connections according to an embodiment of the disclosure.

FIG. 4 illustrates an example in which an electronic device performs time division to make multiple communication connections according to an embodiment of the disclosure.

Referring to FIG. 4, an electronic device (for example, the electronic device 101 of FIG. 1) according to various embodiments may configure a first wake interval 420 and first service periods 411, 413, 415, and 417 for first communication 410 on the basis of the QoS of the first communication 410, wake up and communicate in the first service periods 411, 413, 415, and 417 at the first wake interval 420 for the first communication 410, and when the first service periods 411, 413, 415, and 417 expire, switch to the sleep state for the first communication 410. The first service periods 411, 413, 415, and 417 may be the time at which the electronic device 101 transmits or receives data packets, and the first wake interval 420 may be an interval at which the first service periods 411, 413, 415, and 417 are generated. The first communication 410 (for example, the first communication 250 of FIG. 2) may be one of Wi-Fi, Bluetooth, and UWB or may be a first mode (for example, a station mode) of Wi-Fi. Hereinafter, for convenience of description, the case in which the first communication 410 is the Wi-Fi station mode is described. The electronic device 101 may configure the first wake interval 420 and the first service periods 411, 413, 415, and 417 for the first communication 410 on the basis of the QoS of the first communication 410 or an application executed in the electronic device 101.

The electronic device 101 may configure a second wake interval 470 and second service periods 451, 453, 455, 457, 459, and 461 for the second communication 450 on the basis of the QoS of the second communication 450, wake up and communicate in the second service periods 451, 453, 455, 457, 459, and 461 at the second wake interval 470 for the second communication 450, and when the second service periods 451, 453, 455, 457, 459, and 461 expires, switch to the sleep state for the second communication 450. The second communication 450 (for example, the second communication 260 of FIG. 2) may be a communication scheme (for example, Bluetooth or UWB) different from the first communication 410 or another mode of the first communication 410.

The second communication 450 may be communication using a frequency overlapping with the first communication 410. When the first communication 410 is a Wi-Fi station mode, the second communication 450 may be Bluetooth communication or Wi-Fi hotspot mode. The second communication 450 may be a concept including not only communication connections (for example, Bluetooth and UWB) in the type different from the first communication 410 but also communication connection of other modes of the first communication 410 (for example, Wi-Fi direct, Wi-Fi aware, and Wi-Fi hotspot). The electronic device 101 may configure the second wake interval 470 and the second service periods 451, 453, 455, 457, 459, and 461 for the second communication 450 on the basis of the QoS of the second communication 450 or the application executed in the electronic device 101.

According to various embodiments, when the first wake interval 420 is different from the second wake interval 470, a problem that the first service periods 413 and 417 and the second service periods 455 and 461 overlap every predetermined cycle corresponding to a common multiple of the two wake intervals may occur. The electronic device 101 may wake up according to a predetermined cycle for the first communication 410 and exchange data packets. For example, the first cycle 411 and the third cycle 415 of the first communication 410 do not overlap the second service periods 451, 453, 455, 457, 459, and 461 of the second communication 450, but the second cycle 413 and the fourth cycle 417 of the first communication 410 may overlap the third cycle 455 and the sixth cycle 461 of the second communication 450.

When the first service periods 413 and 417 and the second service periods 455 and 461 corresponding to the common multiple of the first wake interval 420 and the second wake interval 470 overlap, the electronic device 101 may adjust the first wake interval 420 to the second wake interval 470 having a smaller time. For example, the electronic device 101 may adjust the time of the first wake interval 420 such that the first wake interval 420 corresponds to the second wake interval 470. The electronic device 101 may adjust the time of the first wake interval 420 and adjust the first service periods 411, 413, 415, and 417 or the second service periods 451, 453, 455, 457, 459, and 461.

Figure 5:
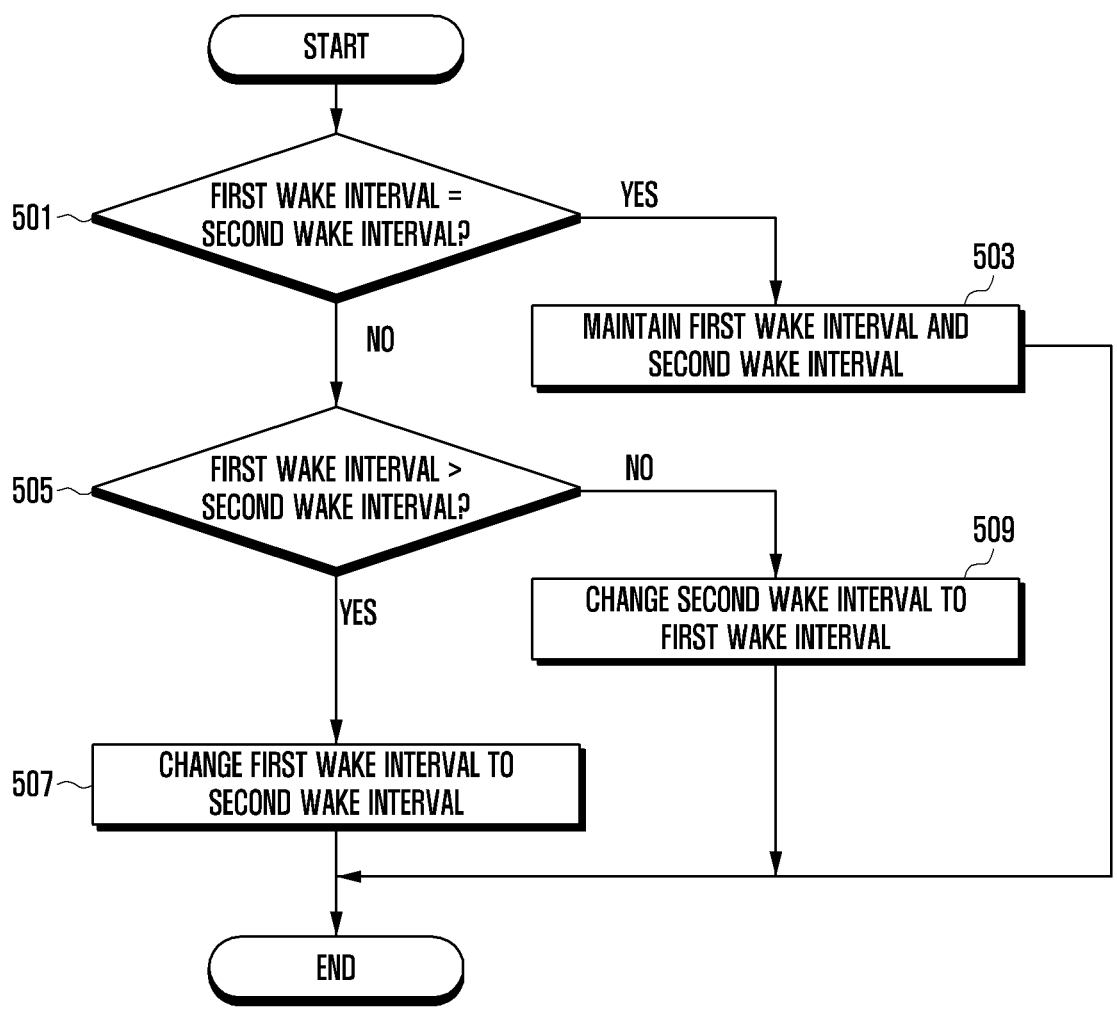
FIG. 5 is a flowchart illustrating a method of controlling a wake interval by an electronic device during multiple communication according to an embodiment of the disclosure.

FIG. 5 is a flowchart illustrating a method of controlling a wake interval by an electronic device during multiple communication according to an embodiment of the disclosure. FIG. 5 may be an operation making operation 304 concretized.

Referring to FIG. 5, in operation 501, a processor (for example, the processor 120 of FIG. 1) of an electronic device (for example, the electronic device 101 of FIG. 1) according to various embodiments may determine whether a first wake interval (for example, the first wake interval 420 of FIG. 4) corresponds to (for example, is the same as) a second wake interval (for example, the second wake interval 470 of FIG. 4). The first wake interval 420 may be an interval at which service periods (for example, the first service periods 411, 413, 415, and 417 of FIG. 4) for the first communication (for example, the first communication 250 of FIG. 2 or the first communication 410 of FIG. 4) are generated. The second wake interval 470 may be an interval at which the service periods (for example, the second service periods 451, 453, 455, 457, 459, and 461 of FIG. 4) for the second communication (for example, the second communication 260 of FIG. 2 or the second communication 450 of FIG. 4) are generated.

The first communication 410 may be one of Wi-Fi, Bluetooth, and UWB, or may be a first mode (for example, a station mode) of Wi-Fi. Hereinafter, for convenience of description, the case in which the first communication 410 is the Wi-Fi station mode is described. The second communication 450 may be a communication scheme (for example, Bluetooth or UWB) different from the first communication 410 or another mode of the first communication 410. The second communication 450 may be communication using a frequency overlapping with the first communication 410. The second communication 450 may be a concept including not only communication connections (for example, Bluetooth and UWB) in the type different from the first communication 410 but also communication connection of other modes of the first communication 410 (for example, Wi-Fi direct, Wi-Fi aware, and Wi-Fi hotspot).

The processor 120 may perform operation 503 when the first wake interval 420 corresponds to the second wake interval 470 and perform operation 505 when the first wake interval 420 does not correspond to the second wake interval 470.

When the first wake interval 420 corresponds to the second wake interval 470, the processor 120 may maintain the first wake interval 420 and the second wake interval 470 in operation 503. When the first wake interval 420 and the second wake interval 470 are the same as each other, the service periods for the first communication 410 may not overlap the service periods for the second communication 450. When the service periods do not overlap between different two communication, efficiency of the operation for allowing the first communication 410 and the second communication 450 to coexist does not deteriorate and thus the processor 120 may remain in the current state.

When the first wake interval 420 does not correspond to the second wake interval 470, the processor 120 may determine whether the first wake interval 420 is larger than the second wake interval 470 in operation 505. In order to arrange the first wake interval 420 and the second wake interval 470 having the time difference therebetween, the time of the wake interval should be changed. When the wake interval is changed to be larger than the wake interval configured by the QoS of communication, latency or the QoS may not be satisfied. When the wake interval is changed to be smaller than the wake interval configured by the QoS of communication, the electronic device 101 may frequently wake up, and thus power consumption may increase but data throughput and latency or QoS may not decrease. In consideration of power consumption of the electronic device 101 according to the communication connection that is not large, satisfying the QoS may have the highest priority. In such an aspect, the processor 120 may change the wake interval to the smaller time.

The processor 120 may perform operation 507 when the first wake interval 420 is larger than the second wake interval 470, and perform operation 509 when the first wake interval 420 is smaller than the second wake interval 470.

When the first wake interval 420 is larger than the second wake interval 470, the processor 120 may change the first wake interval 420 to the second wake interval 470 in operation 507. The processor 120 may change the time of the first wake interval 420 to the time of the second wake interval 470 having a smaller time among the first wake interval 420 and the second wake interval 470.

When the first wake interval 420 is smaller than the second wake interval 470, the processor 120 may change the second wake interval 470 to the first wake interval 420 in operation 509. The processor 120 may change the time of the second wake interval 470 to the time of the first wake interval 420 having a smaller time between the first wake interval 420 and the second wake interval 470.

Figure 6A:
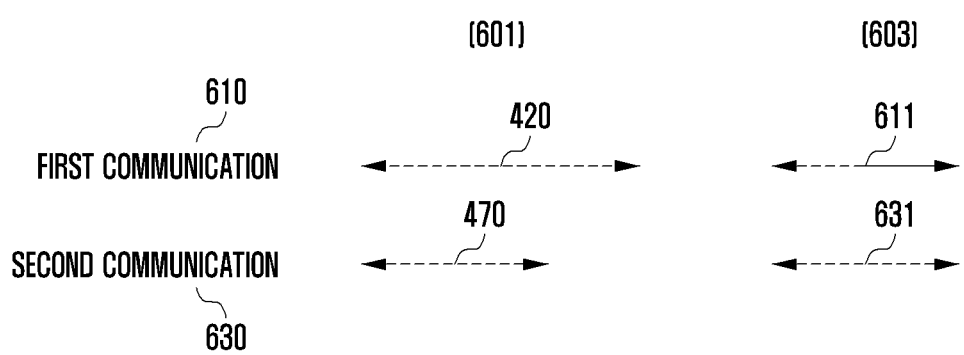

FIGS. 6A and 6B illustrate an example in which an electronic device controls wake intervals according to various embodiments of the disclosure.

Referring to FIG. 6A, a first situation 601 may indicate an example in which an electronic device (for example, the electronic device 101 of FIG. 1) according to various embodiments configures the first wake interval 420 on the basis of the QoS of first communication 610 (for example, the first communication 250 of FIG. 2 or the first communication 410 of FIG. 4) and configures the second wake interval 470 on the basis of the QoS of second communication 630 (for example, the second communication 260 of FIG. 2 or the second communication 450 of FIG. 4). The second communication 630 may be communication using a frequency overlapping with the first communication 610. When the first wake interval 420 and the second wake interval 470 are different from each other, service periods of the first communication 610 and service periods of the second communication 630 may overlap in common multiples of the first wake interval 420 and the second wake interval 470 (for example, FIG. 4). The electronic device 101 may change the first wake interval 420 or the second wake interval 470 such that the service periods of the first communication 610 do not overlap the service periods of the second communication 630.

A second situation 603 may indicate an example in which the electronic device 101 changes the first wake interval 611 according to the second wake interval 631. The electronic device 101 may change the first wake interval 611 according to the second wake interval 470 having a smaller time among the first wake interval 420 and the second wake interval 470 in the first situation 601. The second situation 603 may be a state in which the time of the first wake interval 611 is the same as the time of the second wake interval 631. When the time of the first wake interval 611 is the same as the time of the second wake interval 631, service periods of the first communication 610 may not overlap service periods of the second communication 630 (for example, FIG. 6B).

Referring to FIG. 6B, the electronic device 101 may wake up and communication every first service period 650 at the first wake interval 611 for the first communication 610. The electronic device 101 may wake up and communication every second service period 670 at the second wake interval 631 for the second communication 630. When the first wake interval 611 corresponds to the second wake interval 631, the first service period 650 of the first communication 610 does not overlap the second service period 670 of the second communication 630, and thus the stable communication connection can be made for the first communication 610 and the second communication 630.

The electronic device 101 may make a change such that the first wake interval 611 corresponds to the second wake interval 631 and configure the wake up time of the first service period 650 to have a difference from the wake up time of the second service period 670. The wake up time may be a time at which the service period (for example, the first service period 650 or the second service period 670) starts. When the first wake interval 611 and the second wake interval 631 are the same as each other and the wake up time of the first service period 650 and the wake up time of the second service period 670 are different from each other, the difference between the first service period 650 and the second service period 670 of the first communication 610 and the second communication 630 may be uniformly maintained.

Figure 7:
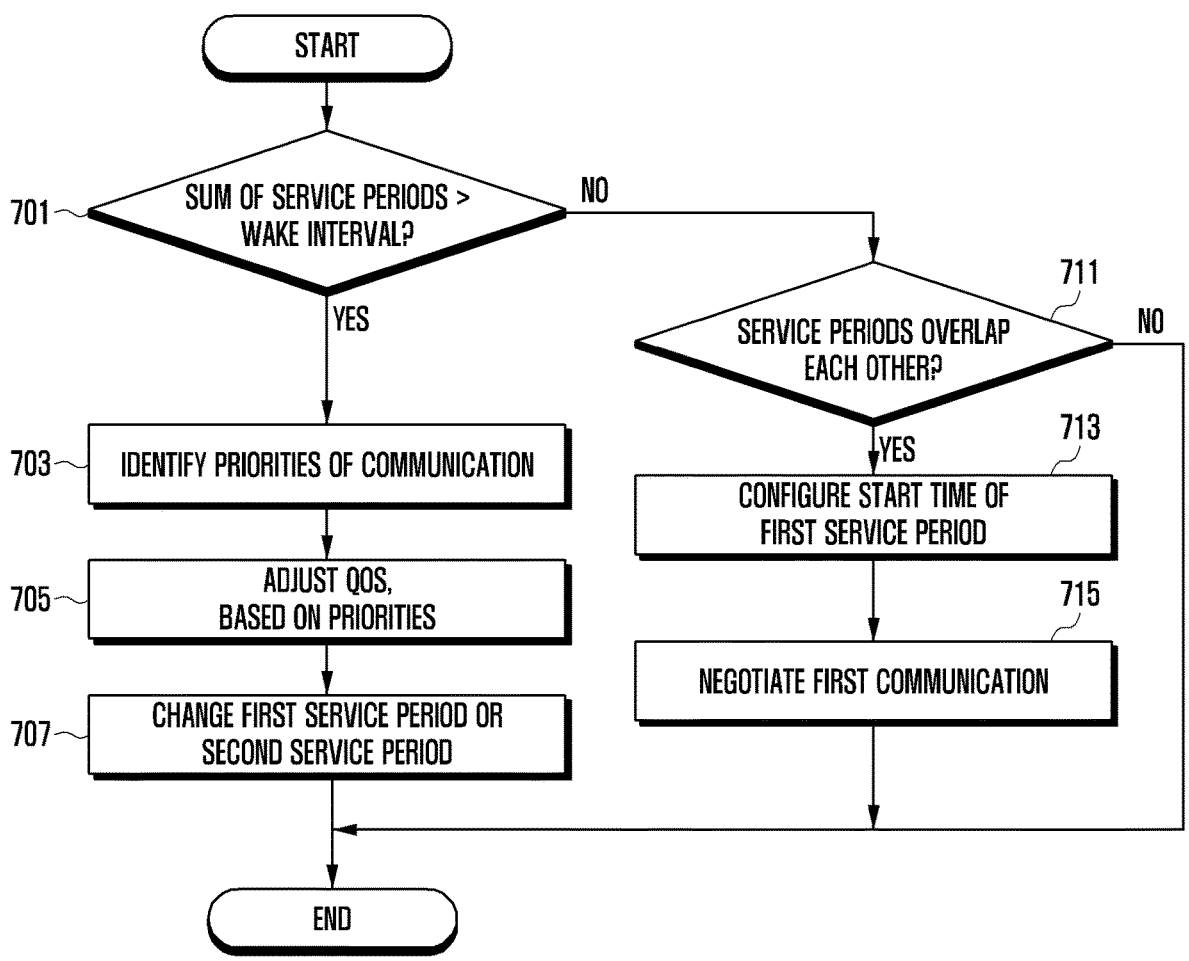
FIG. 7 is a flowchart illustrating a method by which an electronic device controls service periods or wake intervals in multiple communication according to an embodiment of the disclosure.

FIG. 7 is a flowchart illustrating a method by which an electronic device controls service periods or wake intervals in multiple communication according to an embodiment of the disclosure. FIG. 7 may be performed after the operation of FIG. 5.

Referring to FIG. 7, in operation 701, a processor (for example, the processor 120 of FIG. 1) of an electronic device (for example, the electronic device 101 of FIG. 1) according to various embodiments may determine whether a sum of service periods is larger than a wake interval. A first wake interval (for example, the first wake interval 611 of FIGS. 6A and 6B) for first communication (for example, the first communication 250 of FIG. 2, the first communication 410 of FIG. 4 or the first communication 610 of FIGS. 6A and 6B) may correspond to a second wake interval (for example, the second wake interval 631 of FIGS. 6A and 6B) for second communication (for example, the second communication 260 of FIG. 2, the second communication 450 of FIG. 4, or the second communication 630 of FIGS. 6A and 6B). The processor 120 may identify whether a sum of a first service period (for example, the first service period 650 of FIG. 6B) for the first communication 610 and a second service period (for example, the second service period 670 of FIG. 6B) for the second communication 630 is larger than the first wake interval 611 (or the second wake interval 631).

The processor 120 may perform operation 703 when the sum (for example, a sum of time) of the first service period 650 and the second service period 670 is larger than the first wake interval 611, and may perform operation 711 when the sum of the first service period 650 and the second service period 670 is equal to or smaller than the first wake interval 611.

When the sum of the first service period 650 and the second service period 670 is larger than the first wake interval 611, the processor 120 may identify priorities of the communication in operation 703. After changing the first wake interval 611 to correspond to the second wake interval 631, the processor 120 may change the first service period 650 according to the change in the first wake interval 611. For example, the processor 120 may increase the time of the first service period 650 in order to satisfy the QoS of the first communication 610 by reducing the first wake interval 611. When the time of the first service period 650 is increased, the sum of the first service period 650 and the second service period 670 may be larger than the first wake interval 611. When the time of the first service period 650 is increased, the processor 120 may reduce the time of the second service period 670. When the time of the second service period 670 is decreased, the QoS of the second communication 630 may not be satisfied. When it is difficult to satisfy both the QoS of the first communication 610 and the QoS of the second communication 630, the processor 120 may adjust (or change) the QoS of one of them on the basis of the priorities of the communication. The priority of each communication may be configured by the electronic device 101 or determined according to user settings.

In operation 705, the processor 120 may adjust the QoS on the basis of the priority. For example, when the first communication 610 has a higher priority than the second communication 630, the processor 120 may reduce the QoS of the second communication 630. Alternatively, when the second communication 630 has a higher priority than the first communication 610, the processor 120 may reduce the QoS of the first communication 610. Alternatively, the processor 120 may reduce both the QoS of the first communication 610 and the QoS of the second communication 630. For example, the processor 120 may reduce both the QoS of the first communication 610 and the QoS of the second communication 630 on the basis of a state of the electronic device 101 (or an application being executed) or a state of the first communication 610 or the second communication 630.

In operation 707, the processor 120 may change the first service period or the second period on the basis of the adjusted QoS. For example, when the priority of the first communication 610 is high, the processor 120 may reduce the QoS of the second communication 630. When the QoS of the second communication 630 is reduced, the processor 120 may increase the time of the first service period 650 and decrease the time of the second service period 670. Since the QoS of the second communication 630 is reduced, the QoS of the second communication 630 may be satisfied even though the time of the second service period 670 is reduced. Alternatively, when the priority of the second communication 630 is high, the processor 120 may reduce the QoS of the first communication 610. When the QoS of the first communication 610 is reduced, the processor 120 may increase the time of the second service period 670 and decrease the time of the first service period 650. Since the QoS of the first communication 610 is reduced, the QoS of the first communication 610 may be satisfied even though the time of the first service period 650 is reduced.

According to various embodiments, the processor 120 may change the first service period 650 or the second service period 670 and determine whether the first service period 650 and the second service period 670 overlap. When the first service period 650 and the second service period 670 overlap, the processor 120 may change a start time of the first service period 650 or the second service period 670.

When the first wake interval 611 or the first service period 650 is changed, the processor 120 may negotiate the changed first wake interval 611 or first service period 650 with the first communication 610. The negotiation with the first communication 610 may be a negotiation of the first wake interval 611 or the first service period 650 with a medium (for example, the AP 200) providing the first communication 610. Alternatively, when the second wake interval 631 or the second service period 670 is changed, the processor 120 may negotiate the changed second wake interval 631 or second service period 670 with the second communication 630.

When the sum of the first service period 650 and the second service period 670 is equal to or smaller than the first wake interval 611, the processor 120 may determine whether the service periods do not overlap in operation 711. When the first wake interval 611 corresponds to the second wake interval 631, the processor 120 may determine whether the first service period 650 and the second service period 670 do not overlap. The processor 120 may perform operation 713 when the first service period 650 and the second service period 670 overlap, and may end the process when the first service period 650 and the second service period 670 do not overlap. When the first wake interval 611 corresponds to the second wake interval 631 and the first service period 650 and the second service period 670 do not overlap, the processor 120 may end the process.

When the first service period 650 and the second service period 670 overlap, the processor 120 may configure a start time (for example, a wake time) of the first service period 611 in operation 713. The start time of the first service period 611 may be a wake time at which the first service period 611 starts. After changing the first wake interval 611 to correspond to the second wake interval 631, the processor 120 may adjust the first service period 650. When the sum of the first service period 650 and the second service period 670 is equal to or smaller than the first wake interval 611 and the first service period 650 and the second service period 670 overlap after the first service period 650 is adjusted, the processor 120 may change the start time of the first service period 650 such that the first service period 650 and the second service period 670 do not overlap.

After adjusting the first service period 650, the processor 120 may change the second service period 670. The first service period 650 and the second service period 670 may partially overlap according to the change in the first service period 650 and the second service period 670. The processor 120 may change the start time of the first service period 650 such that the first service period 650 and the second service period 670 do not overlap.

In operation 715, the processor 120 may perform a negotiation of the first communication 610. When the first wake interval 611 or the first service period 650 is changed or the start time of the second service period 670 is changed, the processor 120 may negotiate the first communication 610 for at least one of the changed first wake interval 611 or first service period 650, or the start time of the first service period 650. The negotiation of the first communication 610 may be a negotiation for the first wake interval 611, the first service period 650, or the start time of the first service period 650 with the AP 200. The processor 120 may negotiate with the AP 200 by transmitting at least one of the first wake interval 611, the first service period 650, or the start time of the first service period 650 to the AP 200 through a communication module (for example, the communication module 190 of FIG. 1).

Although it is illustrated that the first communication 610 is negotiated according to the change in the first wake interval 611 and the start time of the first service period 650 in drawings, the processor 120 may perform a negotiation of the second communication 630 when the second wake interval 631 or the second service period 670 is changed.

According to various embodiments, when the application executed in the electronic device 101 is changed or a data transmission rate or a contention degree of the AP 200 is changed, the processor 120 may periodically perform the negotiation of the first communication 610.

Figure 8A:
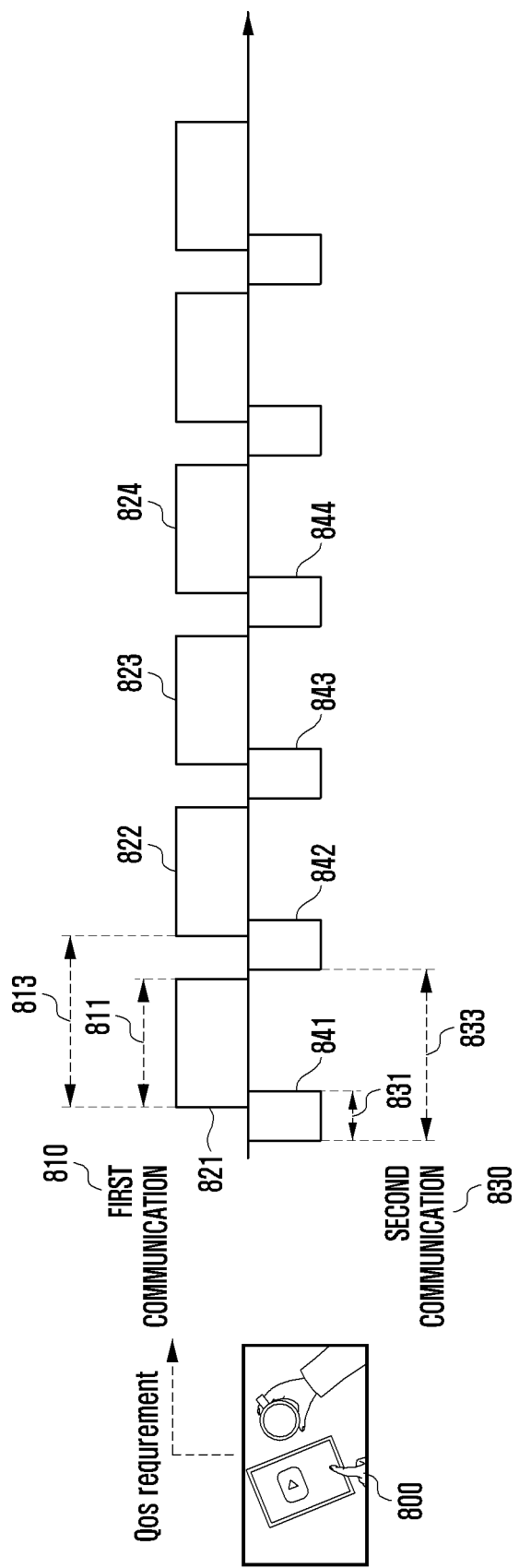
FIGS. 8A and 8B illustrate an example in which an electronic device controls service periods or wake intervals in multiple communication according to various embodiments of the disclosure.
Figure 8B:
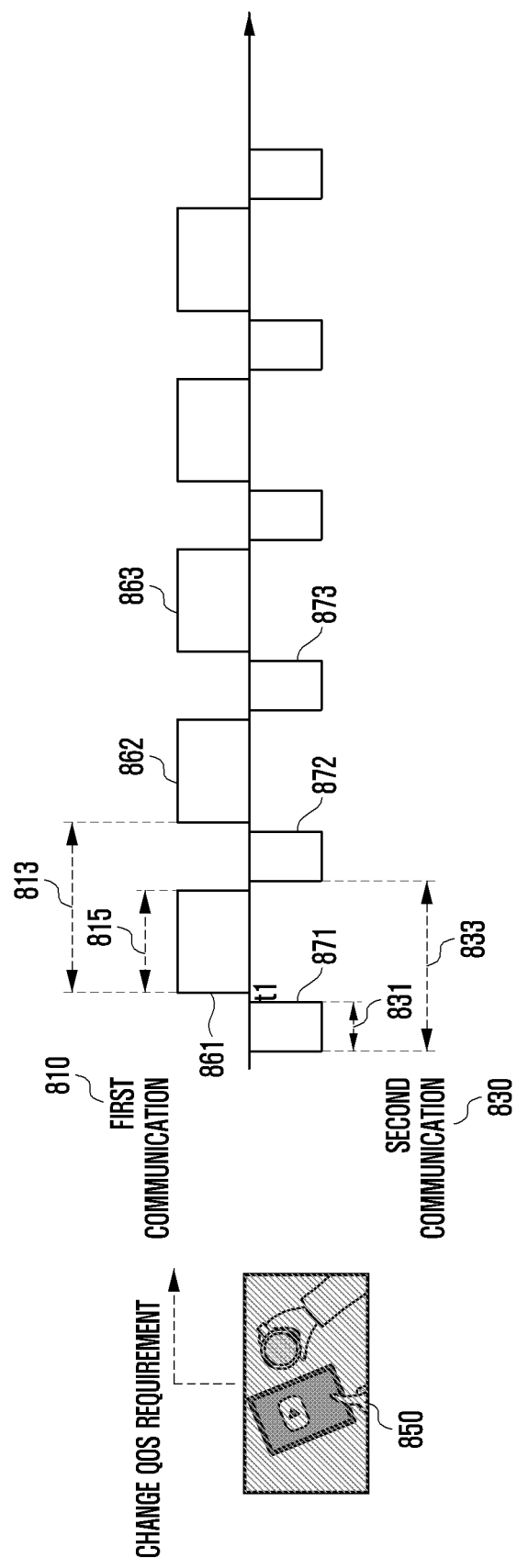

FIGS. 8A and 8B illustrate an example in which an electronic device controls service periods or wake intervals in multiple communication according to various embodiments of the disclosure.

Referring to FIG. 8A, a first situation 800 may indicate an example in which a processor (for example, the processor 120 of FIG. 1) of an electronic device (for example, the electronic device 101 of FIG. 1) according to various embodiments configures a first wake interval 813 and a first service period 811 for first communication 810 on the basis of a QoS of the first communication 810 (for example, the first communication 250 of FIG. 2, the first communication 410 of FIG. 4, or the first communication 610 of FIGS. 6A and 6B) and configures a second wake interval 833 and a second service period 831 for second communication 830 on the basis of a QoS of the second communication 830 (for example, the second communication 260 of FIG. 2, the second communication 450 of FIG. 4, or the second communication 630 of FIGS. 6A and 6B).

The processor 120 may wake up at the wake up time of a first cycle 821, a second cycle 822, a third cycle 823, and a fourth cycle 824 according to the first wake interval 813 for the first communication 810 to exchange data packets and switch to the sleep state when the first service period 811 expires. The processor 120 may wake up at the wake up time of a first cycle 841, a second cycle 842, a third cycle 843, and a fourth cycle 844 according to the second wake interval 833 for the second communication 830 to exchange data packets and switch to the sleep state when the second service period 831 expires.

According to various embodiments, when the first wake interval 813 corresponds to the second wake interval 833, the processor 120 may determine whether the first service period 811 overlaps the second service period 831. When the first wake interval 813 corresponds to the second wake interval 833 and a sum of the first service period 811 and the second service period 831 is equal to or smaller than the first wake interval 813, the processor 120 may determine whether the first service period 811 overlaps the second service period 831. When the first service period 811 overlaps the second service period 831, the processor 120 may adjust the wake up time of the first service period 811 or the second service period 831.

According to various embodiments, when the first wake interval 813 corresponds to the second wake interval 833, the processor 120 may determine whether the sum of the first service period 811 and the second service period 831 is larger than the first wake interval 813. When the sum of the first service period 811 and the second service period 831 is larger than the first wake interval 813, the processor 120 may adjust the QoS of the first communication 810 or the second communication 830 on the basis of the priority of the first communication 810 or the second communication 830. Adjusting the QoS may be reducing a transmission rate of the transmitted and received data packet or a resolution of data included in the data packet. The processor 120 may adjust the QoS of the second communication 830 when the priority of the first communication 810 is higher, and adjust the QoS of the first communication 810 when the priority of the second communication 830 is higher. Alternatively, the processor 120 may adjust both the QoS of the first communication 810 and the QoS of the second communication 830.

Referring to FIG. 8B, a second situation 850 may indicate an example in which the processor 120 adjusts the QoS of the first communication 810 or the second communication 830 and adjusts a wake up time (t1) of the first service period 815. For example, the processor 120 may adjust the first service period 815 on the basis of the adjusted QoS of the first communication 810 or adjust the second service period 831 on the basis of the adjusted QoS of the second communication 830. The processor 120 may wake up on every first cycle 861, second cycle 862, and third cycle 863 according to the first wake interval 813 and transmit and receive data packets of the first communication 810. When the first service period 811 overlaps the second service period 831, the processor 120 may adjust the wake up time (t1) of the first service period 815. The processor 120 may wake up on every first cycle 871, second cycle 872, and third cycle 873 according to the second wake interval 833 and transmit and receive data packets of the second communication 830.

Figure 9A:
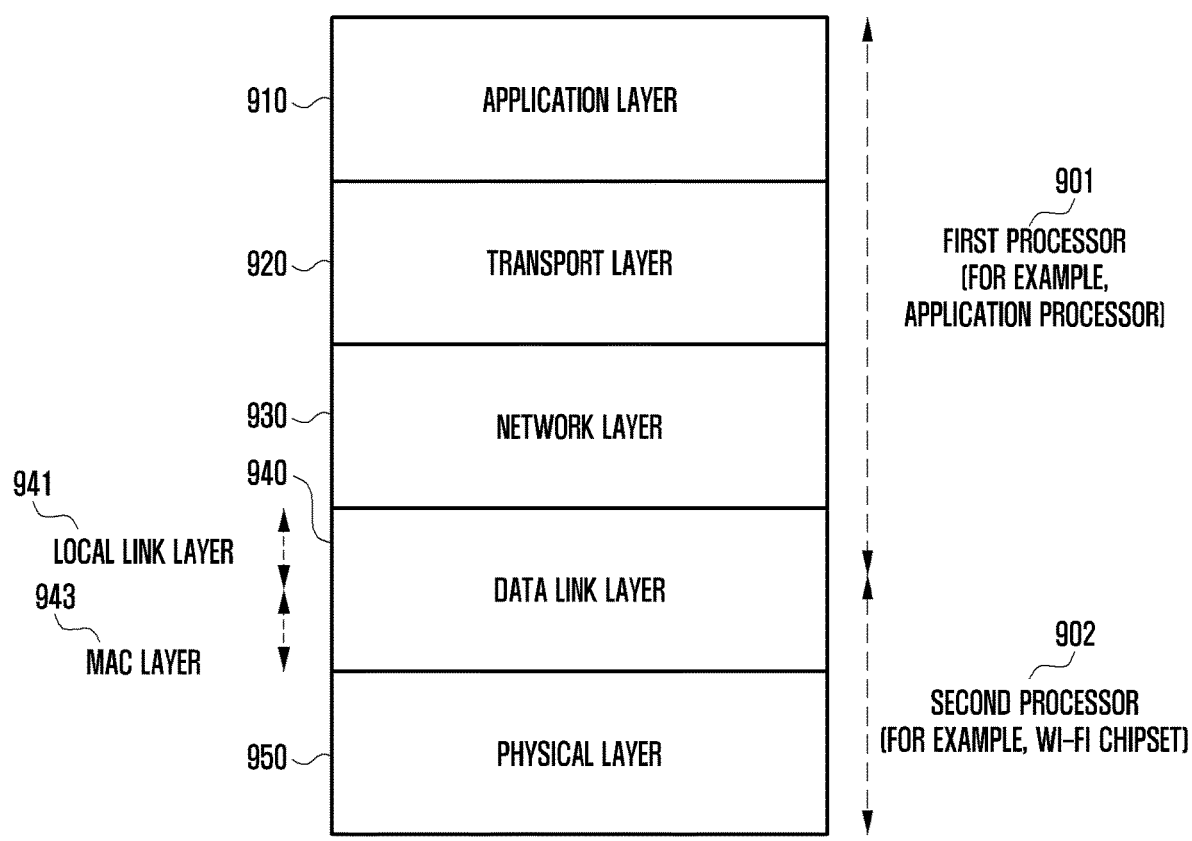
FIG. 9A illustrates the structure of data processing layers of an electronic device according to an embodiment of the disclosure.

FIG. 9A illustrates the structure of data processing layers of an electronic device according to an embodiment of the disclosure.

Referring to FIG. 9A, an electronic device (for example, the electronic device 101 of FIG. 1) according to various embodiments may process data transmitted and received to and from an AP (for example, the AP 200 of FIG. 2) on the basis of a wireless communication protocol. The wireless communication protocol may include an application layer 910, a transport layer 920, a network layer 930, a data link layer 940, and a physical layer 350, and the data link layer 940 may be divided into a local link layer 941 and a medium access control (MAC) layer 943.

The electronic device 101 may process the data (packets) transmitted and received to and from the AP 200 according to the control of a first processor 901 and a second processor 902. For example, data processing by the local link layer 941 of the data link layer 940 from the application layer 910 via the transport layer 920 may be performed by the first processor 901 (for example, the processor 120 or the main processor 121 of FIG. 1), and data processing by the physical layer 950 from the MAC layer 943 of the data link layer 940 may be performed by the second processor 902 (for example, a communication processor, the auxiliary processor 123 of FIG. 1, a Wi-Fi chip, or a communication processor). The second processor 902 may be included in the communication module 190 of FIG. 1 (for example, a Wi-Fi chip).

Figure 9B:
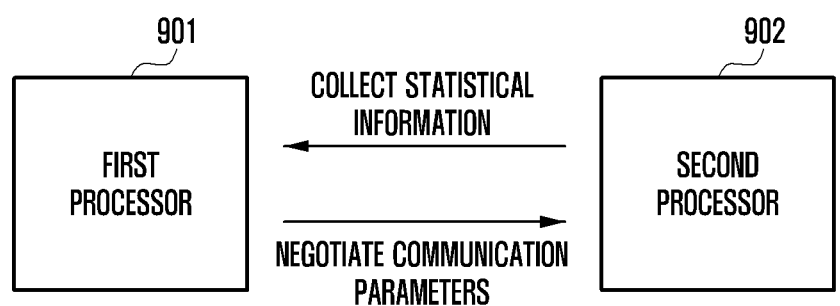
FIG. 9B illustrates the relationship of processing between processors included in the electronic device according to an embodiment of the disclosure.

FIG. 9B illustrates the relationship of processing between processors included in the electronic device according to an embodiment of the disclosure.

Referring to FIG. 9B, data (or packets) related to an application or a service may be processed via the application layer 910, the transport layer 920, the network layer 930, or the local link layer 941 and then transferred to the second processor 902. The second processor 902 may process the data received from the first processor 901 via the MAC layer 943 and the physical layer 950 and transmit data (or packets) to the AP 200 in a service period (for example, the service period 211 of FIG. 2) through a communication link (for example, a Wi-Fi link) with the AP 200.

In another example, the second processor 902 may process the data received from the AP 200 in the service period 211 via the physical layer 950 and the MAC layer 943 and transfer the data to the first processor 901. The first processor 901 may process the data received from the second processor 902 via the local link layer 941, the network layer 930, the transport layer 920, and the application layer 910.

The second processor 902 may collect at least one statistical information among a time at which data packets stored in a buffer (for example, the memory 130 of FIG. 1) are transmitted or received during an interval between two service periods (for example, a doze state or a sleep state), a time at which data packets are transmitted during a service period, a time at which data packets are received, the number of transmitted and received data packets, or a time at which a termination request is received from the AP 200 in the service period. The second processor 902 may transfer the collected statistical information to the first processor 901. The second processor 902 may configure a first service period and a first wake interval related to the first communication 250 on the basis of a QoS of the first communication (for example, the first communication 250 of FIG. 2) received from the first processor 901. Alternatively, the second processor 902 may configure a second service period and a second wake interval related to the second communication 260 on the basis of a QoS of the second communication (for example, the second communication 260 of FIG. 2) received from the first processor 901.

QoS requirements may vary depending on an application. The first processor 901 may instruct the second processor 902 to negotiate communication parameters (for example, service periods and wake intervals) on the basis of the collected statistical information or an application being executed in the electronic device 101. For example, the first processor 901 may determine whether the first service period and the first wake interval related to the first communication 250 configured by the second processor 902 satisfy the QoS of the first communication 250. The first processor 901 may determine whether the second service period and the second wake interval related to the second communication 260 configured by the second processor 902 satisfy the QoS of the second communication 260 on the basis of the collected statistical information or the application being executed in the electronic device 101. The first processor 901 may monitor whether the QoS of communication is satisfied and instruct the second processor 902 to negotiate communication parameters.

A method of operating an electronic device (for example, the electronic device 101 of FIG. 1) according to various embodiments of the disclosure may include an operation of configuring a first service period and a first wake interval related to first communication, based on a quality of service (QoS) of the first communication, an operation of, in case that a connection of a second communication having a frequency overlapping a frequency of the first communication is detected, configuring a second service period and a second wake interval related to the second communication, based on a QoS of the second communication, an operation of determining whether the first wake interval and the second wake interval have a time difference, and an operation of changing at least one of the first wake interval or the second wake interval such that the first wake interval corresponds to the second wake interval, based on a result of the determination.

The operation of changing may include an operation of changing the second wake interval to correspond to the first wake interval in case that the first wake interval is smaller than the second wake interval and changing the first wake interval to correspond to the second wake interval in case that the second wake interval is smaller than the first wake interval.

The operation of configuring may include an operation of configuring the first service period and the first wake interval, based on at least one of an application being executed in the electronic device, a data transmission rate related to the first communication, or a contention degree.

The operation of making the change may include an operation of, in case that the first wake interval corresponds to the second wake interval, maintaining the first wake interval and the second wake interval.

The operation of making the change may include an operation of, in case that the first wake interval is changed, changing the first service period.

The operation of making the change may include an operation of determining whether the sum of the first service period and the second service period is larger than the first wake interval and an operation of changing the first service period and the second service period, based on a result of the determination.

The operation of changing may further include an operation of, in case that the sum of the first service period and the second service period is larger than the first wake interval, identifying priorities of the first communication and the second communication, and an operation of adjusting the QoS of the first communication or the second communication, based on the identified priorities, and an operation of changing the first service period or the second service period according to the adjusted QoS.

The operation of changing may further include, in case that the priority of the first communication is higher than the priority of the second communication, an operation of adjusting the QoS of the second communication, and an operation of changing first service period, based on the QoS of the first communication and the second service period, based on the adjusted QoS of the second communication.

The method may further include an operation of, in case that the sum of the first service period and the second service period is equal to or smaller than the first wake interval, determining whether the first service period and the second service period overlap, an operation of, in case that the first service period and the second service period overlap, configuring a start time of the first service period, and an operation of performing a first communication negotiation for at least one of the configured first wake interval, the first service period, or the start time of the first service period.

While the disclosure has been shown and described with reference to various embodiments thereof, it will be understood by those skilled in the art that various changes in form and details may be made therein without departing from the spirit and scope of the disclosure of the disclosure as defined by the appended claims and their equivalents.

What is claimed is:

1. An electronic device comprising:
a memory; and
a processor operatively connected to the memory,
wherein the memory comprises instructions causing the processor to:
configure a first service period and a first wake interval related to a first communication, based on a quality of service (QoS) of the first communication,
in case that a connection of a second communication having a frequency overlapping a frequency of the first communication is detected, configure a second service period and a second wake interval related to the second communication, based on a QoS of the second communication, determine whether the first wake interval and the second wake interval have a time difference, and change at least one of the first wake interval or the second wake interval such that the first wake interval corresponds to the second wake interval, based on a result of the determination.

2. The electronic device of claim 1, wherein the memory further comprises instructions causing the processor to:
in case that the first wake interval is smaller than the second wake interval, change the second wake interval to correspond to the first wake interval, and
in case that the second wake interval is smaller than the first wake interval, change the first wake interval to correspond to the second wake interval.

3. The electronic device of claim 1, wherein the memory further comprises instructions causing the processor to configure the first service period and the first wake interval, based on at least one of an application being executed in the electronic device, a data transmission rate related to the first communication, or a contention degree.

4. The electronic device of claim 1, wherein the memory further comprises instructions causing the processor to detect the connection of the second communication having the frequency overlapping the frequency of the first communication in a state in which a connection of the first communication is maintained.

5. The electronic device of claim 1, wherein the memory further comprises instructions causing the processor to maintain the first wake interval and the second wake interval in case that the first wake interval corresponds to the second wake interval.

6. The electronic device of claim 1, wherein the memory further comprises instructions causing the processor to change the first service period in case that the first wake interval is changed.

7. The electronic device of claim 1, wherein the memory further comprises instructions causing the processor to:
determine whether a sum of the first service period and the second service period is larger than the first wake interval, and
change the first service period or the second service period, based on a result of the determination.

8. The electronic device of claim 7, wherein the memory further comprises instructions causing the processor to:
in case that the sum of the first service period and the second service period is larger than the first wake interval:
identify priorities of the first communication and the second communication,
adjust the QoS of the first communication or the second communication, based on the identified priorities, and
change the first service period or the second service period according to the adjusted QoS.

9. The electronic device of claim 8, wherein the memory further comprises instructions causing the processor to, in case that the priority of the first communication is higher than the priority of the second communication:
adjust the QoS of the second communication, and
change first service period, based on the QoS of the first communication and the second service period, based on the adjusted QoS of the second communication.

10. The electronic device of claim 1, wherein the memory further comprises instructions causing the processor to:

in case that a sum of the first service period and the second service period is equal to or smaller than the first wake interval, determine whether the first service period and the second service period overlap, in case that the first service period and the second service period overlap, configure a start time of the first service period, and perform a first communication negotiation for at least one of the configured first wake interval, the first service period, or the start time of the first service period.

11. The electronic device of claim 1, further comprising:
a first processor; and
a communication module,
wherein the processor is a second processor included in the communication module, and
wherein the memory further comprises instructions causing the second processor to receive the QoS of the first communication or the QoS of the second communication from the first processor.

12. A method of operating an electronic device, the method comprising:
configuring a first service period and a first wake interval related to a first communication, based on a quality of service (QoS) of the first communication;
in case that a connection of a second communication having a frequency overlapping a frequency of the first communication is detected, configuring a second service period and a second wake interval related to the second communication, based on a QoS of the second communication;
determining whether the first wake interval and the second wake interval have a time difference; and
changing at least one of the first wake interval or the second wake interval such that the first wake interval corresponds to the second wake interval, based on a result of the determination.

13. The method of claim 12, wherein the making of the change comprises:
in case that the first wake interval is smaller than the second wake interval, changing the second wake interval to correspond to the first wake interval; or
in case that the second wake interval is smaller than the first wake interval, changing the first wake interval to correspond to the second wake interval.

14. The method of claim 12, wherein the configuring comprises configuring the first service period and the first wake interval, based on at least one of an application being executed in the electronic device, a data transmission rate related to the first communication, or a contention degree.

15. The method of claim 12, wherein the making of the change comprises, in case that the first wake interval corresponds to the second wake interval, maintaining the first wake interval and the second wake interval.

16. The method of claim 12, wherein the making of the change comprises, in case that the first wake interval is changed, changing the first service period.

17. The method of claim 12, wherein the making of the change further comprises:
determining whether the sum of the first service period and the second service period is larger than the first wake interval; and
changing the first service period and the second service period, based on a result of the determination.

18. The method of claim 17, wherein the making of the change further comprises:
in case that the sum of the first service period and the second service period is larger than the first wake interval, identifying priorities of the first communication and the second communication; and adjusting the QoS of the first communication or the second communication, based on the identified priorities, and an operation of changing the first service period or the second service period according to the adjusted QoS.

19. The method of claim 18, wherein the making of the change further comprises:

in case that the priority of the first communication is higher than the priority of the second communication, adjusting the QoS of the second communication; and changing first service period, based on the QoS of the first communication and the second service period, based on the adjusted QoS of the second communication.

20. The method of claim 12, wherein the making of the change further comprises:

in case that the sum of the first service period and the second service period is equal to or smaller than the first wake interval, determining whether the first service period and the second service period overlap;

in case that the first service period and the second service period overlap, configuring a start time of the first service period; and performing a first communication negotiation for at least one of the configured first wake interval, the first service period, or the start time of the first service period.

* * * * *